United States Patent [19]

Tanaka et al.

[11] Patent Number: 5,354,096
[45] Date of Patent: Oct. 11, 1994

[54] INFLATABLE SEATBELT SYSTEM

[75] Inventors: Yoshihiko Tanaka, Tokyo; Tsuneo Chikaraishi, Hikone, both of Japan

[73] Assignee: Takata Corporation, Tokyo, Japan

[21] Appl. No.: 99,464

[22] Filed: Jul. 30, 1993

[30] Foreign Application Priority Data

Aug. 6, 1992 [JP] Japan .................................. 4-210354

[51] Int. Cl.⁵ ................................................ B60R 21/08
[52] U.S. Cl. ................................ 280/733; 280/801.1
[58] Field of Search ........................... 280/733, 801 R

[56] References Cited

U.S. PATENT DOCUMENTS

3,791,670 2/1974 Lycore et al. ................. 280/733
3,877,719 4/1975 Lewis et al. .................. 280/733
3,929,348 12/1975 Lawwill ........................ 280/733

*Primary Examiner*—Kenneth R. Rice
*Attorney, Agent, or Firm*—Varndell Legal Group

[57] ABSTRACT

An inflatable seatbelt system having a webbing (11) formed in the shape of a bag from a woven fabric. The warp of the webbing (11) is disposed in the longitudinal direction of the seatbelt, and the weft is disposed in the lateral direction of the seatbelt. The weft is formed of spandex threads made of a material having a relatively low modulus of elasticity and stretchable in a rubber-like manner, e.g., urethane. The weft (15) on the reverse side of a portion of the webbing (11) corresponding to the boundary between a shoulder belt (2) and a lap belt (3) is cut over a predetermined area. A gas outlet portion (5e) of a tongue (5) is inserted into the shoulder belt (2) from an opening 11(c) formed by widening the cut area of the weft (15). The lap belt (3) of the webbing (11), which extends in the opposite direction to the direction of insertion of the gas outlet portion (5e), is passed through a webbing receiving hole (5b) provided in an operating portion (5c) of the tongue (5) by slightly contracting the lap belt 3 in the direction of the width thereof. A belt cap (16) is fitted onto the gas outlet portion (5e) of the tongue (5) with the webbing (11) interposed therebetween, thereby securing the tongue (5) to the webbing (11).

7 Claims, 7 Drawing Sheets

INFLATABLE SEATBELT SYSTEM

BACKGROUND OF THE INVENTION

The present invention relates to an inflatable seatbelt system having a webbing at least a part of which is formed in the shape of a bag and which is maintained in a strap-like configuration under normal circumstances but, when an emergency situation occurs, inflates by the action of a gas supplied from a gas generating device.

Hitherto, seatbelt systems have been attached to the seats of many vehicles, for example, automobiles. A typical seatbelt system is arranged to restrain the occupant's body by a webbing upon the occurrence of an emergency situation, e.g., a collision of the vehicle, thereby protecting the occupant from injury which would otherwise be done to him or her by collision with a part of the vehicle body. In such a seatbelt system, however, the width of the webbing, which constitutes a belt for restraining the occupant's body, is not so large. Therefore, the occupant's body locally receives a relatively heavy load when restrained by the webbing.

Under these circumstances, a variety of inflatable seatbelt systems have been proposed in which the webbing is formed in the shape of a bag, and under normal circumstances, the bag-shaped webbing is maintained in a strap-like configuration so as to function as an ordinary seatbelt, whereas, when an emergency occurs, the bag-shaped webbing is inflated by a gas introduced thereinto from a gas generating device so as to function as an air belt whereby the occupant's body is received by the inflated webbing. For example, see Japanese Patent Application Laid-Open (KOKAI) Nos. 47-26830 and 49-88220. Such an inflatable seatbelt system allows the kinetic energy of the occupant's body to be received by the webbing having a wider area. Thus, the load is dispersed, and hence the occupant's body receives a relatively light load. Accordingly, the occupant is protected even more effectively.

When inflating, the webbing shortens longitudinally and, at the same time, increases in thickness. Consequently, the webbing presses the occupant's body against the seat by an amount corresponding to the increase in the thickness. That is, since the length of the webbing shortens and the thickness thereof increases due to the inflation of the webbing, it is possible to obtain a webbing pull-in effect similar to the effectiveness obtained when the webbing is actually pulled in. Accordingly, the inflatable seatbelt system makes it possible to obtain initial restraining force similar to that provided by a pretensioner.

With the initial restraining force, the inflatable seatbelt system completely restrains the occupant's body during a crashable zone, i.e., a period between the time when a vehicle comes into collision and the time when the front part of the vehicle, gradually crashing, reaches the occupant's body. Accordingly, it is possible to make good use of the crashable zone.

If it is intended to provide a rear seat with an air bag system as is provided for the occupant seated in the front seat, the air bag system must inevitably be provided on the front seat, which lies forwardly of the rear seat. However, if the air bag system is provided on the front seat, it is difficult for the air bag system to protect the rear seat occupant properly and effectively because the position in the longitudinal direction of the front seat depends on the occupant seated therein and the reclining position also differs according to circumstances. Accordingly, the above-described inflatable seatbelt system is particularly effective as a safety device for the rear seat.

Incidentally, to introduce a gas generated by a gas generating device into a bag-shaped portion of a webbing, one method can be conceived in which the bag-shaped portion of the webbing is connected to a tongue formed with a gas flow hole in such a manner that the gas flow hole opens in the bag-shaped portion, and a buckle device is provided with the gas generating device and formed with a gas flow hole for the gas generated from the gas generating device so that when the tongue is engaged with the buckle device, the respective gas flow holes of the tongue and the buckle device are communicated with each other, thereby enabling the gas from the gas generating device to be introduced into the bag-shaped portion of the webbing through the two gas flow holes.

The above-described gas introducing method involves the problem of how to connect the bag-shaped portion of the webbing to the tongue. Methods which have heretofore been conceived include those which are shown in FIG. 8. According to one conventional method, as shown in FIG. 8(a), the opening end of the bag-shaped portion of the webbing 11 is inserted into the gas flow hole 5g of the tongue 5, and a lock member 17 is inserted into the opening of the bag-shaped portion and then expanded to clamp the opening end of the bag-shaped portion between the inner peripheral surface of the gas flow hole 5g of the tongue 5 and the outer peripheral surface of the lock member 17.

Figure 8A:
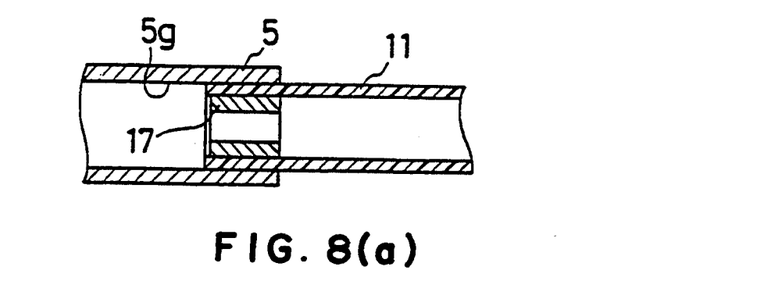
FIGS. 8(a), 8(b) and 8(c) are fragmentary sectional views for explanation of methods of connecting together a bag-shaped portion of a webbing and a tongue, which have heretofore been conceived.
Figure 8B:
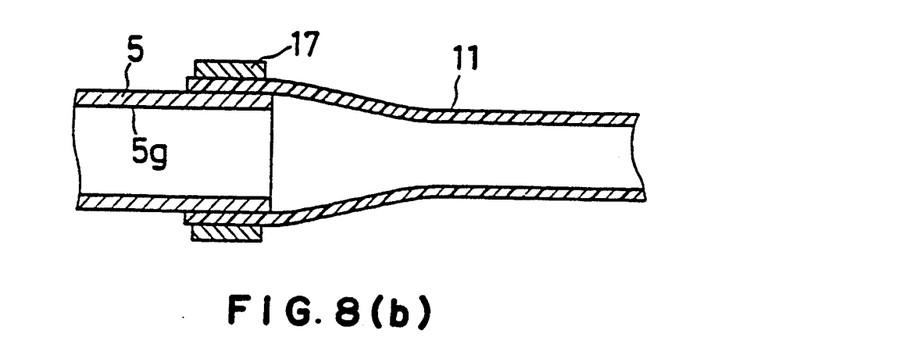

According to another conventional method, as shown in FIG. 8(b), the end of the tongue 5 where the gas flow hole 5g opens is inserted into the opening end of the bag-shaped portion of the webbing 11, and a lock member 17 is fitted onto the outer periphery of the opening end of the bag-shaped portion and then contracted from the outer side thereof, thereby clamping the opening end of the bag-shaped portion between the outer peripheral surface of the opening end of the tongue 5, where the gas flow hole 5g opens, and the inner peripheral surface of the lock member 17, in a manner reverse to the method shown in FIG. 8(a).

Figure 8C:
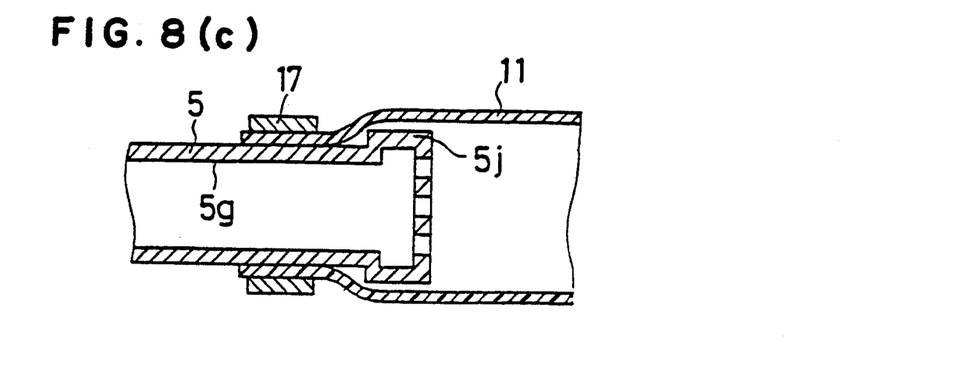

Still another conventional method is similar to the method shown in FIG. 8(b). In this method, however, the opening end of the tongue 5, where the gas flow hole 5g opens, is enlarged in diameter to form an enlarged-diameter portion 5j, as shown in FIG. 8(c), and the opening end of the bag-shaped portion is clamped between the enlarged-diameter portion 5j and the lock member 17.

Incidentally, in the inflatable seatbelt system, when deceleration rapidly acts on the vehicle, large tension is longitudinally applied to the webbing not only by the inertia acting on the occupant's body but also by the expansion force resulting from the inflation of the bag-shaped portion of the webbing caused by the gas from the gas generating device.

With the above-described conventional methods of connecting together the bag-shaped portion of the webbing and the tongue, however, the strength of the connection between these two members with respect to the tension acting in the longitudinal direction of the webbing is not very high because in the conventional methods the webbing is merely clamped in the radial direction, and it is necessary to increase the strength of the connection to a sufficiently high level in order to enable the large longitudinal tension to be surely received.

If it is intended to increase the strength of the connection made by the above-described conventional methods, the joint of the tongue and the bag-shaped portion of the webbing becomes relatively large in size. However, if the joint increases in size, the operatability of the tongue deteriorates. In addition, it is difficult for the seatbelt to fit smoothly to the occupant's body when it is fastened thereto.

SUMMARY OF THE INVENTION

It is an object of the present invention to provide an inflatable seatbelt system which is capable of satisfactorily and reliably coping with large longitudinal tension applied to the webbing without the need for increasing the size of the joint of the tongue and the bag-shaped portion of the webbing.

To attain the above-described object, the present invention provides an inflatable seatbelt system for a vehicle including at least: a device for generating a gas when deceleration acting on the vehicle upon the occurrence of an emergency situation, for example, a collision of the vehicle, exceeds first set deceleration; a webbing having a portion brought into contact with the occupant's body, at least a part of the contact portion being formed as a bag-shaped portion, the webbing being arranged such that when no gas is generated from the gas generating device, the webbing is maintained in the shape of a strap having a predetermined width, whereas, when a gas is generated from the gas generating device, the bag-shaped portion is inflated by the gas; a retractor operating such that when the deceleration on the vehicle is not higher than second set deceleration, which is lower than the first set deceleration, the retractor allows the webbing to be freely wound up and unwound, whereas, when the deceleration on the vehicle exceeds the second set deceleration, the retractor prevents unwinding of the webbing; a tongue connected to the webbing; and a buckle device with which the tongue is disengageably engaged. The tongue has an engagement portion engageable with the buckle device and having a gas inlet port to which the gas generated by the gas generating device is introduced through the buckle device when the tongue is in engagement with the buckle device, and an operating portion having a webbing receiving hole through which the webbing extends and used to engage and disengage the tongue in relation to the buckle device. The tongue further has a gas outlet portion formed with a width larger than the width of the bag-shaped portion and connected to the webbing and having a gas outlet port for the gas, and a gas flow hole providing communication between the gas inlet and outlet ports. The webbing is formed of a webbing base fabric made out of a woven fabric. The warp of the webbing base fabric is disposed in the longitudinal direction of the seatbelt, and the weft is disposed in the lateral direction of the seatbelt. The weft is formed of spandex threads made of a material having a relatively low modulus of elasticity and stretchable in a rubber-like manner, for example, urethane. The weft is cut in a predetermined region including one end of the bag-shaped portion. The gas outlet portion of the tongue is inserted into the bag-shaped portion from the weft cut area so that a part of the bag-shaped portion is brought into close contact with the gas outlet portion by elastic force of the weft which is not cut. The webbing extends through the webbing receiving hole at a portion thereof which extends in a direction opposite to the direction of insertion of the gas outlet portion so that the gas outlet portion is prevented from slipping out of the bag-shaped portion by at least the portion of the webbing which lies in the webbing receiving hole.

The tongue may have a neck portion for connecting together the operating portion and the gas outlet portion. The neck portion has a width smaller than the width of the gas outlet portion so that the gas outlet portion is prevented from slipping out of the bag-shaped portion by the presence of a step defined between the gas outlet portion and the neck portion.

The arrangement may be such that the portion of the bag-shaped portion which is in close contact with the gas outlet portion is brought into close contact therewith even more firmly by a belt cap made of an elastic material, and the inside of the bag-shaped portion is kept airtight by the belt cap.

The arrangement may be such that the surface of the gas outlet portion lies closer to the side of the tongue from which the webbing is inserted into the webbing receiving hole than the surface of the operating portion.

In the inflatable seatbelt system according to the present invention, arranged as described above, the gas outlet portion of the tongue is attached by virtue of the elastic force of the weft of the webbing and the elastic force of the belt cap, and the gas outlet portion is surely prevented from slipping out of the shoulder belt by the portion of the webbing that extends through the webbing receiving hole of the tongue. Therefore, the strength of the connection between the tongue and the webbing need not be made very high. Accordingly, it is not necessary to particularly enlarge the joint of the tongue and the webbing, and there is no lowering in the operatability of the tongue. Moreover, the seatbelt smoothly fits to the occupant's body when fastened thereto.

Further, since the plane of the gas outlet portion of the tongue lies closer to the side of the tongue from which the webbing is inserted into the webbing receiving hole of the operating portion than the plane of the operating portion, there is substantially no rising of the portion of the webbing which lies immediately behind the hole. Thus, the operatability of the tongue is further improved.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIGS. 3(*a*) and 3(*b*) are views showing a belt employed in the embodiment, in which FIG. 3(*a*) is a partly-cutaway perspective view of the belt, and FIG. 3(*b*) is a cross-sectional view of the belt.

FIGS. 4(a), 4(b) and 4(c) are views showing a webbing in the embodiment, in which

FIGS. 5(a) through 5(f) are views showing a buckle device employed in the embodiment, in which

FIGS. 6(a), 6(b) and 6(c) are views for explanation of a method of attaching the tongue to the webbing in the embodiment, in which

FIGS. 7(a) and 7(b) are views showing a belt cap employed in the embodiment, in which

DESCRIPTION OF THE PREFERRED EMBODIMENTS

Figure 1:
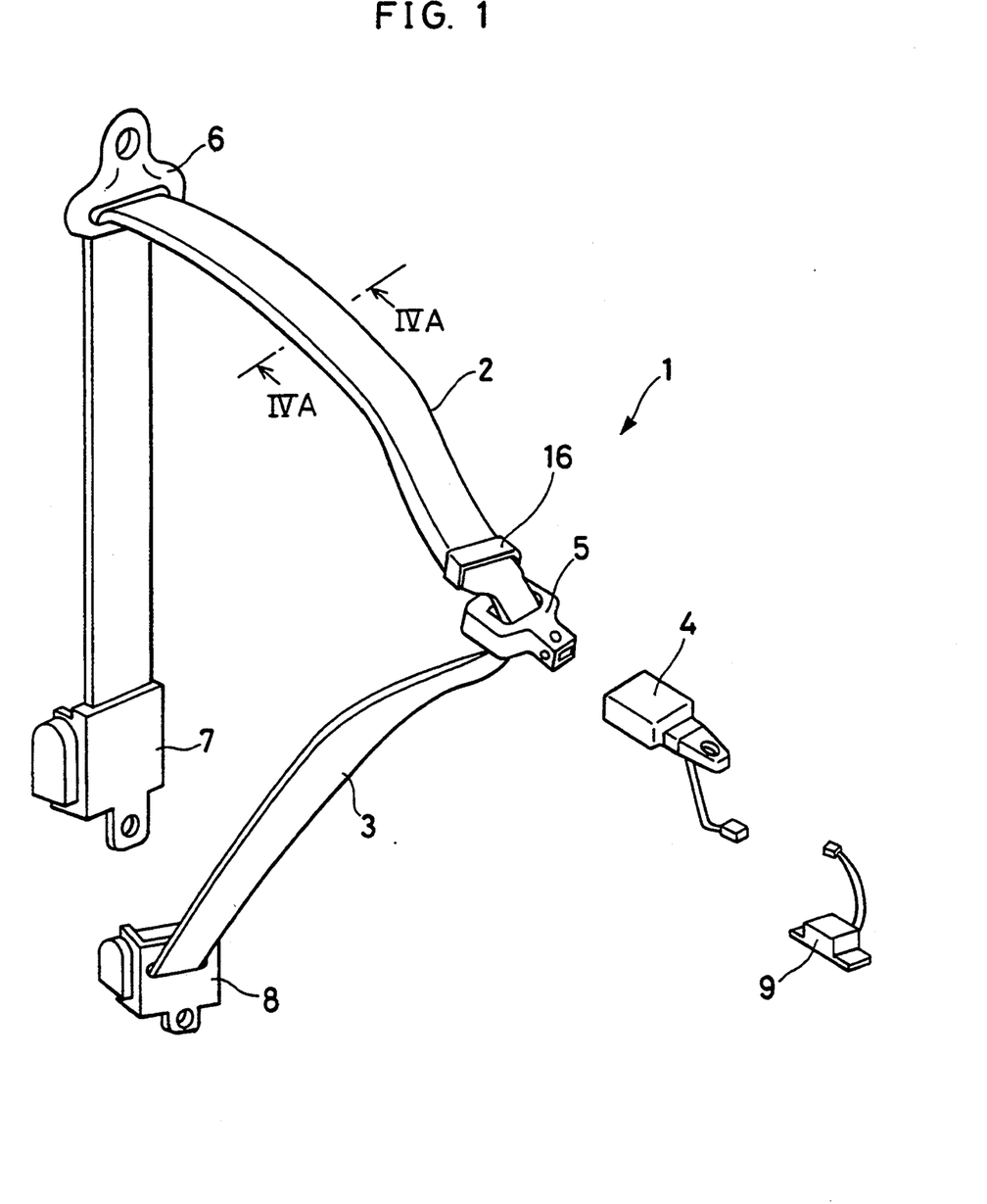
FIG. 1 schematically shows the whole arrangement of one embodiment of the inflatable seatbelt system according to the present invention.

As shown in FIG. 1, the inflatable seatbelt system 1 in this embodiment has a shoulder belt 2 disposed to extend obliquely downward from one side to the other of the occupant's body (from the right-hand side to the left-hand side in the illustrated example), a lap belt 3 disposed to extend from one side to the other of the occupant's body (from the right-hand side to the left-hand side in the illustrated example), a buckle device 4 disposed, for example, on the floor of a vehicle body, a tongue 5 inserted into the buckle device 4 so as to be engaged therewith when the occupant fastens the seatbelt, a pillar anchor 6 disposed on a center pillar or other vehicle body member to serve as an intermediate guide for guiding the shoulder belt 2, a retractor 7 with a clamp for winding up the shoulder belt 2, a retractor 8 for winding up the lap belt 3, and a deceleration sensor 9 accommodated in the buckle device 4 for sensing extremely high deceleration as acts upon the occurrence of a collision of the vehicle or other similar accident.

Figure 2:
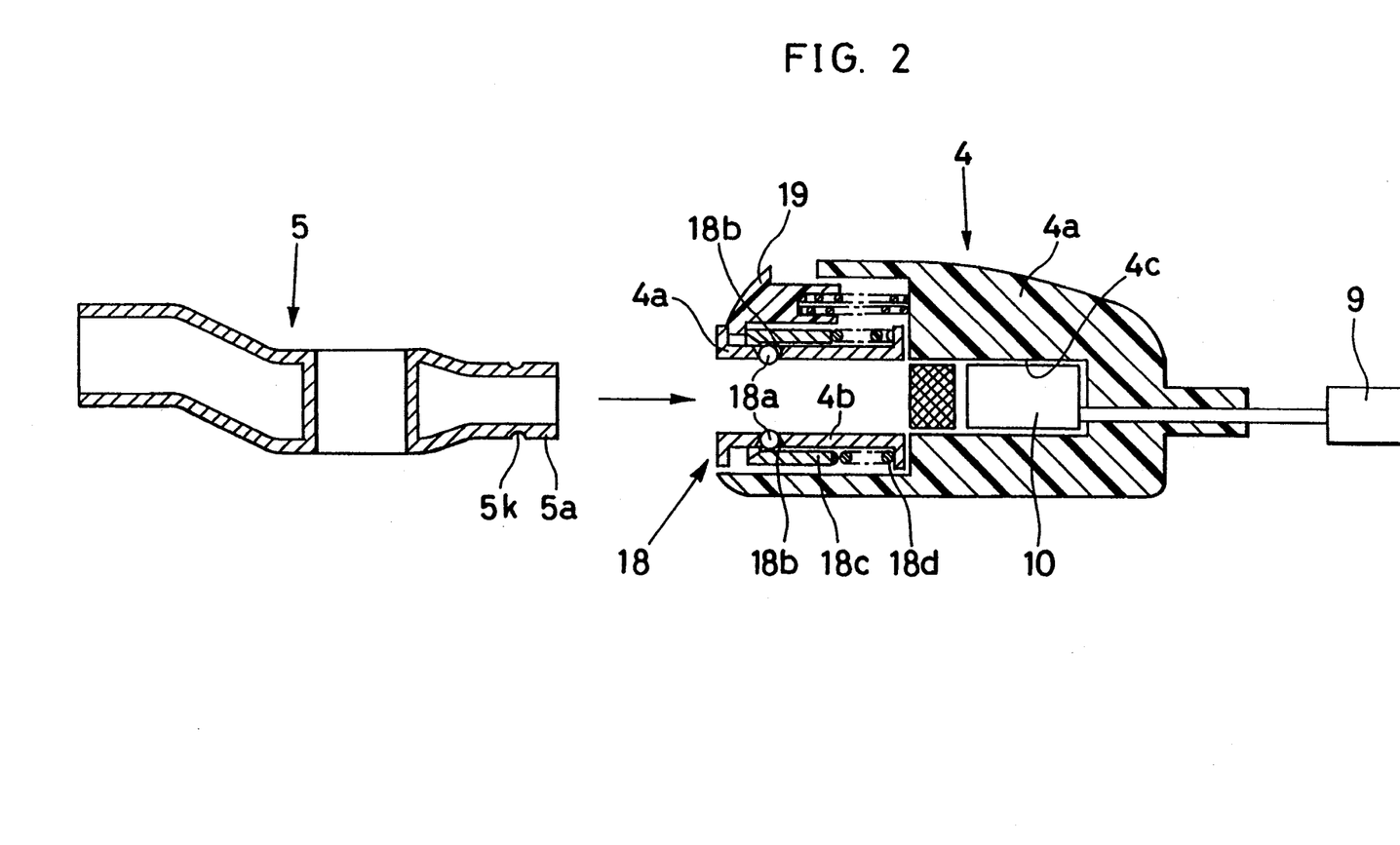
FIG. 2 is a sectional view schematically showing one example of the structure for engagement between a tongue and a buckle device, which are employed in the embodiment.

As shown in FIG. 2, the buckle device 4 has a body 4a, an insertion hole 4b provided in the body 4a for insertion of the tongue 5, and an accommodating hole 4c formed in the body 4a contiguously with the insertion hole 4b. The accommodating hole 4c accommodates a gas generator (G.G.) 10 which is connected to the deceleration sensor 9. The gas generator 10 is activated to generate a high-pressure gas in response to a high-deceleration detecting signal from the deceleration sensor 9.

An engaging device 18 is provided in the insertion hole 4b. The engaging device 18 is arranged such that when the tongue 5 is inserted into the insertion hole 4b, the engaging device 18 engages with the tongue 5. The engaging device 18 has ball-shaped engagement members 18a, and frusto-conical guide holes 18b formed in the body 4a such that the small-diameter side of each guide hole 18b opens to the insertion hole 4b so as to guide the associated engagement member 18a between two positions, that is, an engaging position where the engagement member 18a projects into the insertion hole 4b, and a non-engaging position where the engagement member 18a withdraws from the insertion hole 4b. The engaging device 18 further has a square cylinder-shaped lock member 18c for locking the engagement members 18a in the engaging position, and a spring 18d for biasing the lock member 18c in the direction for locking the engagement members 18a.

The buckle device 4 is further provided with a release button 19 for moving the lock member 18c in the direction for unlocking the engagement members 18a against the biasing force of the spring 18d. On the other hand, an insertion portion 5a of the tongue 5 is formed with engagement grooves 5k which are engaged with the engagement members 18a when in the engaging position.

When the tongue 5 is to be engaged with the buckle device 4 to fasten the seatbelt, the release button 19 is first moved rightwardly as viewed in FIG. 2 to move the lock member 18c to the unlock position where the engagement members 18a are movable to the respective non-engaging positions. In this state, the insertion portion 5a of the tongue 5 is inserted into the insertion hole 4b, and the engagement members 18a are fitted into the respective engagement grooves 5k.

When the release button 19 is released after the engagement members 18a have been fitted into the engagement grooves 5k, the release button 19 and the lock member 18c return to their previous positions shown in the figure. In the illustrated position, the lock member 18c locks the engagement members 18a in the state of being fitted in the engagement grooves 5k. Thus, the tongue 5 is locked to the buckle device 4. It should be noted that the structure of the tongue 5 will be detailed later.

Figure 3A:
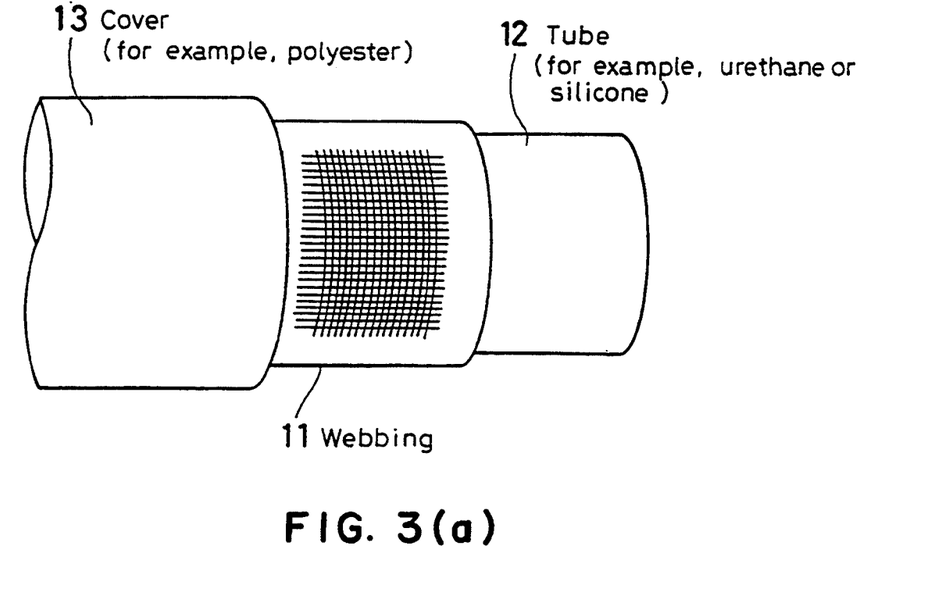
Figure 3B:
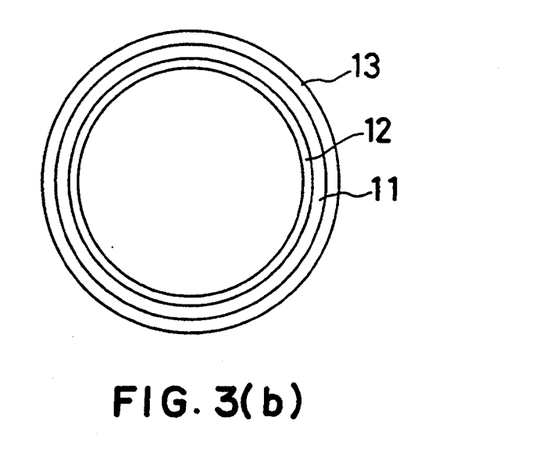

The shoulder belt 2 and the lap belt 3 are formed as one unit. As shown in FIGS. 3(a) and 3(b), these belts are formed from a tubular webbing 11, a tube 12 inserted in the webbing 11, and a cover 13 covering the webbing 11. The tube 12 is made of an elastic material which can be formed relatively thin and which has heat resistance and relatively high strength, e.g., urethane, silicone, etc. The cover 13 is made of a resin material, e.g., polyester.

Figure 4A:
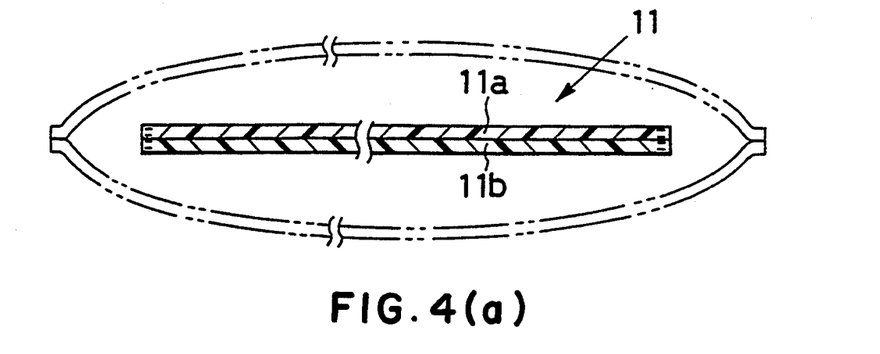
FIG. 4(a) is a sectional view taken along the line IVA—IVA in FIG. 1.
Figure 4B:
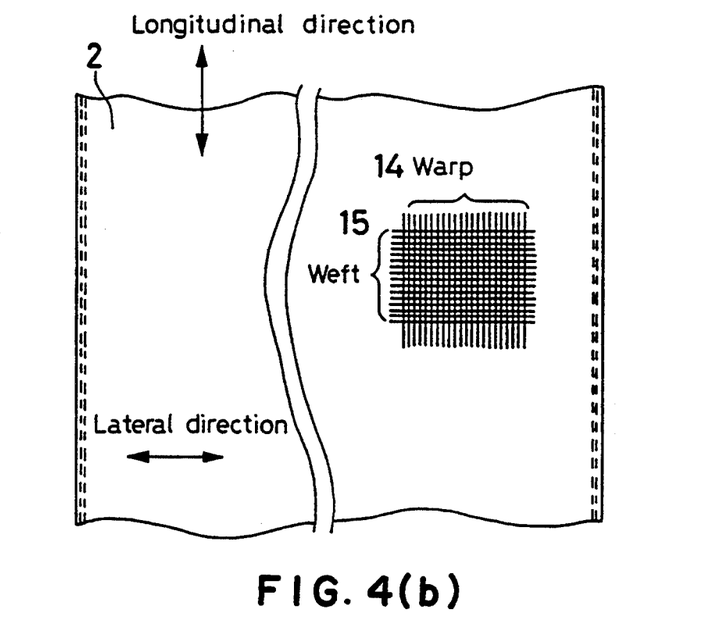
FIG. 4(b) shows the positional relationship between the warp and the weft.

As shown in FIGS. 4(a) and 4(b), the webbing 11 is formed in a tubular configuration by laying two strap-like webbing base fabrics 11a and 11b one on top of the other, which are woven fabrics each cut into a predetermined width (e.g., 50 mm), which is approximately equal to the width of a typical conventional seatbelt, and then sewing the respective side edges of the base fabrics 11a and 11b to each other at both lateral ends of the webbing 11. In this case, the warp 14 is disposed parallel to the longitudinal direction of the webbing 11, and the weft 15 is disposed in the lateral direction of the webbing 11, as shown in FIG. 4(b).

The warp 14 is formed of threads which are not practically stretchable and have high strength, made of the same material as that of the webbing of the conventional seatbelt. In other words, the warp 14 is formed by using threads having such load-elongation characteristics that the warp 14 will not practically stretch even if tension is applied thereto when the webbing 11 is inflated by the action of the gas generator 10, as described later.

Figure 4C:
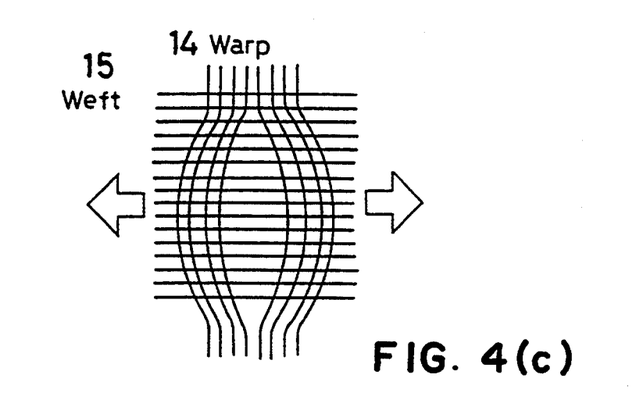
FIG. 4(c) is a view for explanation of the features of the webbing.

On the other hand, the weft 15 is formed of rubber-like stretchable threads made of an elastic material, e.g., urethane. Accordingly, when a predetermined level of tension is laterally applied to the webbing 11, the webbing base fabrics 11a and 11b stretch laterally to a relatively large extent, as shown in FIG. 4(c), whereas, when tension is longitudinally applied thereto, the webbing base fabrics 11a and 11b do not practically stretch longitudinally. It should be noted that in FIG. 4(c), the weft 15 is shown to be stretching by the illustration of the enlarged gap between the warp threads 14. It should also be noted that in FIG. 4(c) the warp 14 looks as if it were curvedly stretching because of the exaggerated illustration, but actually, the warp 14 does not practically stretch.

In the webbing 11 formed as described above, the weft 15 is normally in the most contracted state, as shown by the solid line in FIGS. 4(a) and 4(b). In this normal condition, the width of the webbing 11 is approximately the same as that of the webbing of the conventional seatbelt. In the normal condition, the webbing 11 is in the flattest state and hence the thickness thereof is the smallest.

In actual use, at least a part of the tubular webbing 11 is formed in the shape of a bag. When a gas is supplied into the bag-shaped portion of the webbing 11, the bag-shaped portion is caused to inflate by the gas pressure. At this time, tension is applied to both the warp 14 and the weft 15 by the expansion force of the bag-shaped portion of the webbing 11. As has been described above, the warp 14 does not practically stretch even if such tension is applied thereto, but the weft 15 is stretched by the tension. Consequently, the webbing 11 inflates to a large extent in the lateral direction but does not practically expand longitudinally, as shown by the two-dot chain line in FIG. 4(a).

As shown in FIGS. 5(a) through 5(f), the tongue 5 includes an insertion portion 5a, which has a gas inlet port $5a_1$ and is inserted into and engaged with the buckle device 4, and an operating portion 5c that has a webbing receiving hole 5b for guiding the webbing 11 extending therethrough and that is used to engage and disengage the tongue 5 in relation to the buckle device 4. The tongue 5 further includes a connecting portion 5d to which the shoulder belt 2 is connected, and an engagement portion (not shown) which is engaged with the engaging device of the buckle device 4 when the buckle 5 is inserted into the buckle device 4. The connecting portion 5d includes a gas outlet portion 5e that is formed with a gas outlet port $5e_1$ and that has a width larger than the inner width of the tubular shoulder belt 2, and a neck portion 5f that connects the gas outlet portion 5e to the operating portion 5c and that has a width smaller than that of the gas outlet portion 5e. Accordingly, a step 5i is defined between the gas outlet portion 5e and the neck portion 5f.

The insertion portion 5a, the operating portion 5c, the neck portion 5f and the gas outlet portion 5e are formed with a continuous gas flow hole 5g extending through these portions to provide communication between the gas inlet port $5a_1$ and the gas outlet port $5e_1$. In this case, the gas flow hole 5g is formed to bypass the webbing receiving hole 5b of the operating portion 5c so as not to interfere with it.

Figure 5A:
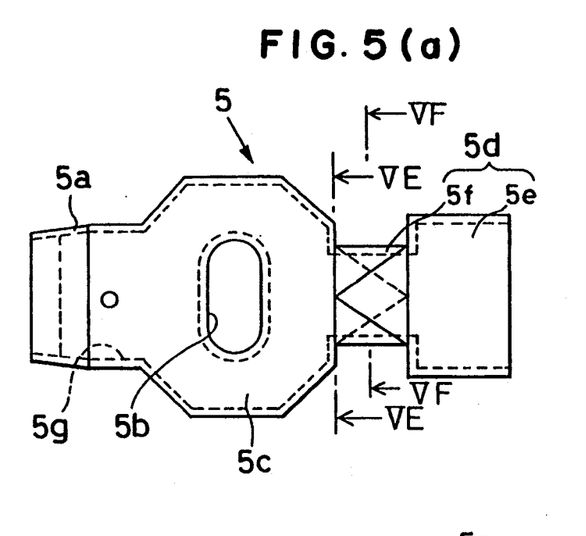
FIG. 5(a) is a plan view of the buckle device.
Figure 5B:
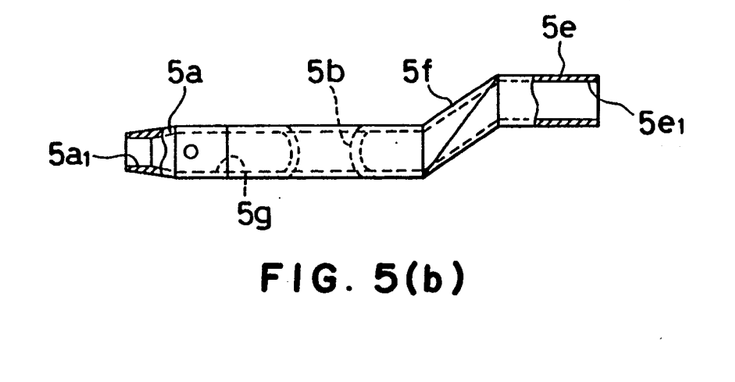
FIG. 5(b) is a front view of the buckle device.
Figure 5C:
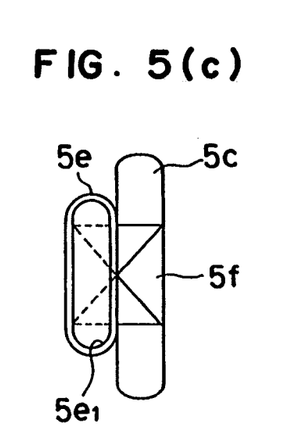
FIG. 5(c) is a side view of the buckle device as seen from the right-hand side thereof.
Figure 5D:
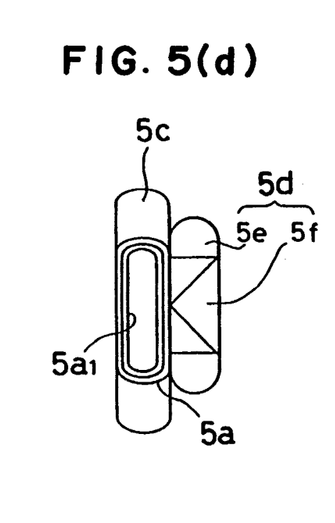
FIG. 5(d) is a side view of the buckle device as seen from the left-hand side thereof.
Figure 5E:
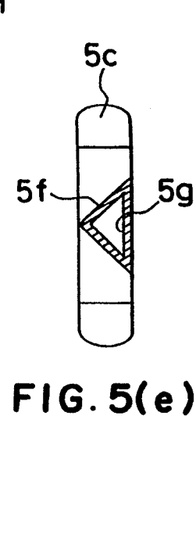
FIG. 5(e) is a sectional view taken along the line VE—VE in FIG. 5(a)
Figure 5F:
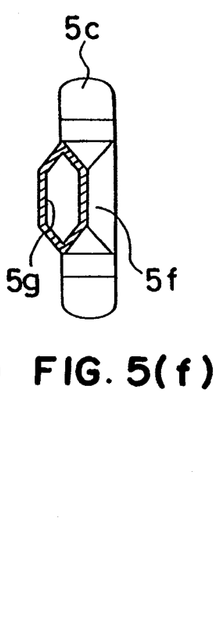
FIG. 5(f) is a sectional view taken along the line VF—VF in FIG. 5(a).

In addition, the insertion portion 5a, the operating portion 5c and the gas outlet portion 5e are each formed to have a rectangular or elliptical cross-sectional configuration. Further, the end of the neck portion 5f which is connected to the operating portion 5c is formed to have a triangular cross-sectional configuration, as shown in FIG. 5(e), and the axially central portion of the neck portion 5f has a hexagonal cross-sectional configuration. That is, the neck portion 5f is formed in such a configuration that the two axial ends thereof have triangular cross-sectional configurations which are inverse to each other, and the intermediate portion of the neck portion 5f has a hexagonal cross-sectional configuration. Further, the insertion portion 5a and the operating portion 5c are disposed on a plane different from the plane where the gas outlet portion 5e is disposed, as shown in FIG. 5(b). That is, as shown in FIG. 6(b), the surface of the gas outlet portion 5e lies closer to the side (the upper side as viewed in the figure) from which the webbing 11 is inserted into the webbing receiving hole 5b than the surface of the insertion portion 5a and the operating portion 5c.

Figure 6A:
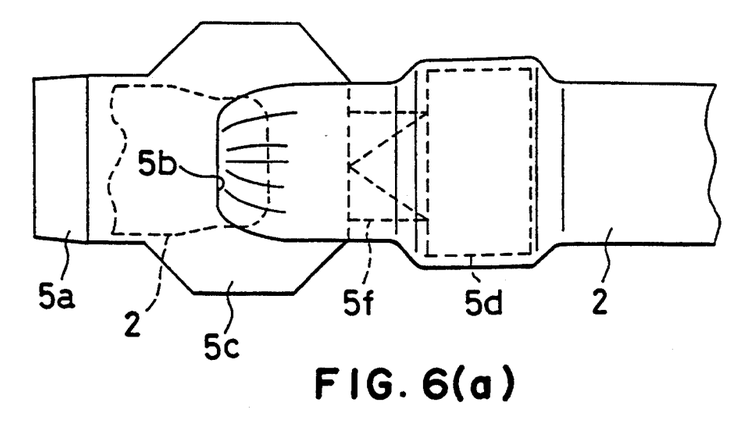
FIG. 6(a) is a plan view of the joint of the tongue and the webbing.

The following is a description of a method of attaching the tongue 5, arranged as described above, to the webbing 11 constituting the shoulder belt 2 and the lap belt 3. As shown in FIG. 6(c), the weft 15 on the reverse side of the portion of the webbing 11 which corresponds to the boundary between the shoulder belt 2 and the lap belt 3 is cut over a predetermined area at the center in the direction of the width of the webbing 11. Next, the weft cut area of the webbing 11 is widened in the lateral direction to form an opening 11c having a predetermined width. The gas outlet portion 5e of the tongue 5 is inserted into the webbing 11 toward the shoulder belt portion thereof from the opening 11c.

Figure 6B:
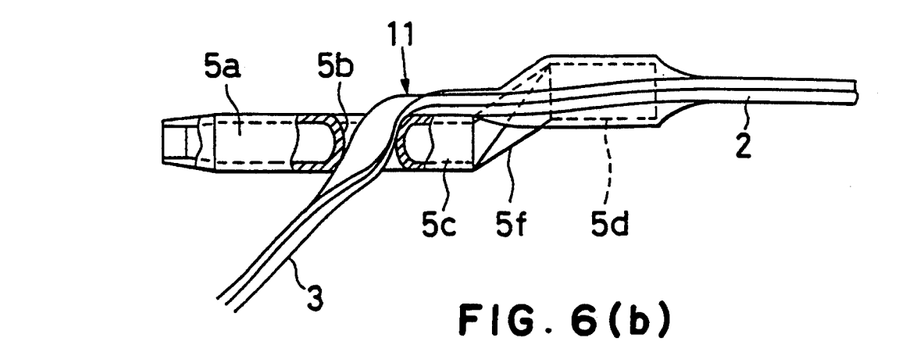
FIG. 6(b) is a partially-cutaway front view of the joint.
Figure 6C:
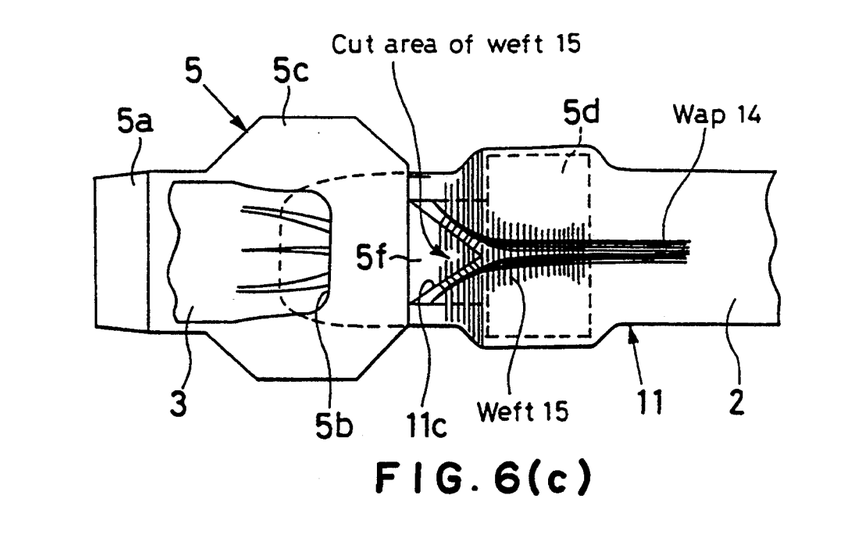
FIG. 6(c) is a bottom plan view thereof.
Figure 7A:
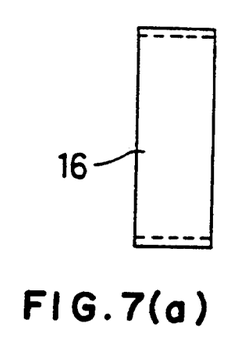
FIG. 7(a) is a front view of the belt cap.
Figure 7B:
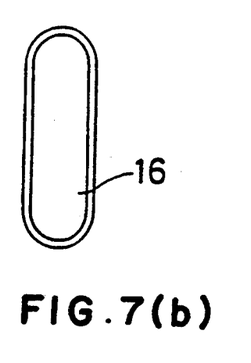
FIG. 7(b) is a side view of the belt cap.

Then, as clearly shown in FIG. 6(b), the lap belt portion of the webbing 11, which extends in the opposite direction to the direction of insertion of the gas outlet portion 5e, is passed through the hole 5b provided in the operating portion 5c by slightly contracting the webbing 11 in the lateral direction. Since the surface of the connecting portion 5d lies above the surface of the operating portion 5c as viewed in FIG. 6(b), the webbing 11 smoothly extends through the hole 5b with minimal rising of the portion 11d thereof which lies immediately behind the hole 5b. Finally, as shown in FIGS. 7(a) and 7(b), an annular belt cap 16 made of an elastic metal material is fitted onto the gas outlet portion 5e of the tongue 5 with the webbing 11 interposed therebetween, thereby securing the tongue 5 to the webbing 11.

With the tongue 5 attached to the webbing 11 in this way, the portion of the shoulder belt 2 which lies at the gas outlet portion 5e is widened with the weft 15 thereof being stretched by the gas outlet portion 5e. Therefore, this portion of the shoulder belt 2 is brought into close contact with the gas outlet portion 5e by the resilience of the weft 15. Further, the width of the webbing 11 is reduced at the neck portion 5f by virtue of the resilience of the weft 15 of the webbing 11, as shown in FIGS. 6(a) and 6(c). Accordingly, the step 5i between the gas outlet portion 5e and the neck portion 5f is surely engaged with the inner wall of the webbing 11. Thus, the gas outlet portion 5e of the tongue 5 is restrained from slipping out of the shoulder belt 2. Further, since the portion 11e of the webbing 11 which extends through the hole 5b of the tongue 5 is in close contact with the inner wall 5h of the hole 5, the tongue 5 is effectively prevented from moving relative to the webbing 11 in the direction in which it slips out of the webbing 11. Accordingly, even if large tension is longitudinally applied to the shoulder belt 2, the tongue 5 is surely prevented from slipping out of the shoulder belt 2.

Further, the portion of the shoulder belt 2 which is pierced with the connecting portion 5d of the tongue 5 is clamped so as to come in close contact with the connecting portion 5d not only by the elastic force of the weft 15 of the webbing 11 but also by the elastic force of the belt cap 16. Therefore, the airtightness of the area of contact between the shoulder belt 2 and the connecting portion 5d of the tongue 5 is satisfactorily ensured.

Further, in the state where the tongue 5 is connected to the webbing 11, the neck portion 5f of the tongue 5 lies in the weft cut area of the webbing 11. Since the neck portion 5f has a cross-section varying from a triangular configuration to a hexagonal configuration, it is possible to minimize the number of weft threads 15 to be cut to form the opening 11c in the webbing 11.

In the inflatable seatbelt system 1 of this embodiment, arranged as described above, the shoulder belt 2 of the bag-shaped webbing 11 is uninflated and maintained in a thin strap-like configuration under normal circumstances, as shown by the solid line in FIG. 4(a). When the seatbelt is not fastened to the occupant's body, the buckle device 4 and the tongue 5 are not in engagement with each other, and the shoulder belt 2 has been wound up by the retractor 7 having a clamp, while the lap belt 3 has been wound up by the retractor 8.

The occupant seated in the seat unwinds the shoulder and lap belts 2 and 3 from the respective retractors 7 and 8 and inserts the tongue 5 into the buckle device 4, thereby fastening the seatbelt. In this seatbelt set condition, the tongue 5 is locked to the buckle device 4 by the lock device, and hence the tongue 5 and the buckle device 4 are maintained in the connected condition without likelihood of the tongue 5 undesirably disengaging from the buckle device 4. Further, when the tongue 5 and the buckle device 4 are in the connected state, the accommodating hole 4c in the buckle device 4 and the gas flow hole 5g in the tongue 5 align with each other to form a single gas flow passage.

Further, in the seatbelt set condition, the shoulder and lap belts 2 and 3 are fitted to the occupant's body by being biased with relatively weak force in the winding-up direction by the respective retractors 7 and 8. This biasing force has previously been set to such a level that the seatbelt will not give a sensation of pressure to the occupant. In addition, under normal circumstances, the take-up reels of the seatbelt retractors 7 and 8 are not locked. Therefore, the two belts 2 and 3 can be unwound freely. Thus, the shoulder belt 2 and the lap belt 3 are smoothly unwound and rewound in response to the normal movement of the occupant's body, thereby allowing an improvement in the comfortability of the seatbelt.

If the deceleration acting on the vehicle exceeds second set deceleration during the running of the vehicle, the occupant's body is urged to move forwardly by inertia, pressing both the belts 2 and 3 to be unwound from the respective seatbelt retractors 7 and 8. However, at this time, the deceleration sensors associated with the retractors 7 and 8 operate to lock the take-up reels, thereby preventing the belts 2 and 3 from being unwound. Particularly, in the seatbelt retractor 7, the shoulder belt 2 is clamped by the clamp. Therefore, the shoulder belt 2 is even more surely prevented from being unwound. Moreover, even if tension is applied to the two belts 2 and 3 in the longitudinal direction of the seatbelt by the inertial movement of the occupant's body, the belts 2 and 3 will not practically stretch because the warp 14, disposed longitudinally, will not practically stretch.

Further, at this time, tension is applied to the tongue 5 from the buckle device side so as to urge the tongue 5 to slip out of the shoulder belt 2. However, there is no likelihood of the tongue 5 slipping out of the shoulder belt 2, as described above.

Accordingly, the occupant's body is effectively and reliably restrained by the shoulder and lap belts 2 and 3, thereby being prevented from moving forwardly. At this time, the shoulder belt 2 is guided by the intermediate guide 6 so as to come in contact with the correct position on the occupant's body. Thus, the inflatable seatbelt system 1 of this embodiment functions as a seatbelt for restraining the occupant's body in a similar manner to the conventional seatbelt system. It should be noted that although the weft 15 in a predetermined region is cut when the tongue 5 is to be attached to the webbing 11, the warp 14 is not cut at all. Therefore, sufficiently high strength is ensured for the two belts 2 and 3 to endure tension in the longitudinal direction.

If extremely high deceleration acting on the vehicle upon the occurrence of an emergency, e.g., a collision of the vehicle, exceeds first set deceleration, not only both the belts 2 and 3 are prevented from being unwound by the seatbelt retractors 7 and 8, but also the deceleration sensor 9 provided on the vehicle detects the extremely high deceleration and activates the gas generator 10. Consequently, the gas generator 10 generates a high-pressure gas, and the gas thus generated instantaneously enters the bag-shaped shoulder belt 2 through the accommodating hole 4c of the buckle device 4 and the gas flow hole 5g of the tongue 5. As a result, the weft 15 is stretched by the pressure of the gas entering the shoulder belt 2. Therefore, the shoulder belt 2 surely and almost instantaneously inflates into a configuration such as that shown by the two-dot chain line in FIG. 4(a).

Accordingly, the upper half of the occupant's body, i.e., the shoulder, the chest, etc., is surely and effectively supported by the inflated shoulder belt 2. Since the kinetic energy of the occupant's body is received with a relatively wide area by virtue of the inflation of the shoulder belt 2, the load is dispersed, and the occupant is reliably protected from a heavy impact load. That is, the inflatable seatbelt system 1 functions as an air belt.

When the shoulder belt 2 inflates, the weft 15 stretches, but the warp 14 slightly contracts. Therefore, the shoulder belt 2 slightly contracts in the longitudinal direction. As a result, the inflatable seatbelt system 1 can function as a pretensioner by virtue of the inflation of the shoulder belt 2, thereby enabling the slack in the seat belt to be taken up even more quickly. Thus, the inflatable seatbelt system 1 surely and effectively exhibits the seatbelt function, resulting in an improvement in the occupant restraining performance of the seatbelt. In this case also, there is no likelihood of the tongue 5 slipping out of the shoulder belt 2.

To release the tongue 5 from the buckle device 4, the lock made by the engaging device 18 is canceled by actuating the release button 19. Consequently, the tongue 5 disengages from the buckle device 4. In addition, the shoulder and lap belts 2 and 3 are wound up by the respective seatbelt retractors 7 and 8.

With the inflatable seatbelt system 1 of this embodiment, arranged as described above, the webbing 11 is formed simply by laying two webbing base fabrics 11a and 11b one on top of the other, which are set to have a width equal to that of the ordinary seatbelt. Accordingly, the thickness of the seatbelt under normal circumstances can be made extremely small in comparison to the folded seatbelt in the conventional inflatable seatbelt system. Thus, the seatbelt can be unwound and rewound even more smoothly. In addition, since it is possible to minimize the belt take-up capacity of the seatbelt retractors 7 and 8, these retractors 7 and 8 can be formed in even more compact structures.

Further, since the seatbelt need not be folded, it is unnecessary to conduct a seatbelt folding operation, which requires a great deal of time and labor, during the assembly of the seatbelt. Accordingly, it is possible to reduce the number of operating steps needed for the production of the seatbelt and to assemble the seatbelt extremely easily.

In addition, since the two webbing base fabrics 11a and 11b, which constitute the seatbelt, are cut into a width equal to that of the ordinary seatbelt, the amount of base fabric used can be reduced by a large margin in comparison to the conventional inflatable seatbelt.

Further, the tongue 5 is attached by virtue of the elastic force of the weft 15 of the webbing 11 and the elastic force of the belt cap 16, and the gas outlet portion 5e of the tongue 5 is prevented from slipping out of the shoulder belt 2 by the portion 11e of the webbing 11 that extends through the hole 5b of the tongue 5. Therefore, the strength of the connection between the tongue 5 and the webbing 11 need not be made very high. Accordingly, it is not necessary to particularly enlarge the joint of the tongue 5 and the webbing 11, and there is no lowering in the operatability of the tongue 5. Moreover, the seatbelt smoothly fits to the occupant's body when fastened thereto.

Further, since the plane of the gas outlet portion 5e of the tongue 5 lies closer to the side of the tongue 5 from which the webbing 11 is inserted into the hole 5b of the operating portion 5c than the plane of the operating portion 5c, there is substantially no rising of the portion 11d of the webbing 11 which lies immediately behind the hole 5b. Thus, the operatability of the tongue 5 is further improved.

As will be clear from the foregoing description, the inflatable seatbelt system of the present invention can function not only as a seatbelt for restraining the occupant's body in a similar manner to the conventional seatbelt system but also as an air belt for surely protecting the occupant from a heavy impact load by receiving the kinetic energy of the occupant's body with a relatively wide area. Since the webbing of the inflatable seatbelt system is not folded, it can be inflated speedily and smoothly.

Further, according to the present invention, the tongue can surely be prevented from slipping out of the webbing without the need for increasing the strength of the connection between the tongue and the webbing to a very high level. Since the strength of the connection between the tongue and the webbing need not be made very high, it is not necessary to increase the size of the joint of the tongue and the webbing. Accordingly, there is no lowering in the operatability of the tongue, and the seatbelt can smoothly be fitted to the occupant's body when fastened thereto.

Further, since the plane of the gas outlet portion of the tongue lies closer to the side from which the webbing is inserted into the webbing receiving hole than the plane of the operating portion of the tongue, there is substantially no rising of the portion of the webbing which lies immediately behind the webbing receiving hole in the operating portion. Thus, the operatability of the tongue is further improved.

What we claim is:

1. An inflatable seatbelt system for a vehicle including at least: means for generating a gas when deceleration acting on the vehicle upon occurrence of an emergency situation, for example, a collision of the vehicle, exceeds first set deceleration; a webbing having a portion brought into contact with an occupant's body, at least a part of said contact portion being formed as a bag-shaped portion, said webbing being arranged such that when no gas is generated from said gas generating means, said webbing is maintained in the shape of a strap having a predetermined width, whereas, when a gas is generated from said gas generating means, said bag-shaped portion is inflated by the gas; a retractor operating such that when the deceleration on the vehicle is not higher than second set deceleration, which is lower than said first set deceleration, said retractor allows said webbing to be freely wound up and unwound, whereas, when the deceleration on the vehicle exceeds said second set deceleration, said retractor prevents unwinding of said webbing; a tongue connected to said webbing; and a buckle device with which said tongue is disengageably engaged;

wherein said tongue has an engagement portion engageable with said buckle device and having a gas inlet port to which the gas generated by said gas generating means is introduced through said buckle device when said tongue is in engagement with said buckle device, an operating portion having a webbing receiving hole through which said webbing extends and used to engage and disengage said tongue in relation to said buckle device, a gas outlet portion formed with a width larger than a width of said bag-shaped portion and connected to said webbing and having a gas outlet port for said gas, and a gas flow hole providing communication between said gas inlet and outlet ports, and wherein said webbing is formed of a webbing base fabric made out of a woven fabric, said webbing base fabric having warp disposed in a longitudinal direction of the seatbelt and weft disposed in a lateral direction of the seatbelt, said weft being formed of spandex threads made of a material having a relatively low modulus of elasticity and stretchable in a rubber-like manner, for example, urethane, said weft being cut in a predetermined region including one end of said bag-shaped portion, the gas outlet portion of said tongue being inserted into said bag-shaped portion from the weft cut area so that a part of said bag-shaped portion is brought into close contact with said gas outlet portion by elastic force of the weft which is not cut, said webbing extending through said webbing receiving hole at a portion thereof which extends in a direction opposite to the direction of insertion of said gas outlet portion so that said gas outlet portion is prevented from slipping out of said bag-shaped portion by at least the portion of said webbing which lies in said webbing receiving hole.

2. An inflatable seatbelt system according to claim 1, wherein said tongue has a neck portion for connecting together said operating portion and said gas outlet portion, said neck portion having a width smaller than the width of said gas outlet portion so that said gas outlet portion is prevented from slipping out of said bag-shaped portion by the presence of a step defined between said gas outlet portion and said neck portion.

3. An inflatable seatbelt system according to claim 1, wherein the portion of said bag-shaped portion which is in close contact with said gas outlet portion is brought into close contact therewith even more firmly by a belt cap made of an elastic material, and the inside of said bag-shaped portion is kept airtight by said belt cap.

4. An inflatable seatbelt system according to claim 1, wherein the surface of said gas outlet portion lies closer to a side of said tongue from which said webbing is inserted into said webbing receiving hole than the surface of said operating portion.

5. An inflatable seatbelt system according to claim 2, wherein the portion of said bag-shaped portion which is in close contact with said gas outlet portion is brought into close contact therewith even more firmly by a belt cap made of an elastic material, and the inside of said bag-shaped portion is kept airtight by said belt cap.

6. An inflatable seatbelt system according to claim 2, wherein the surface of said gas outlet portion lies closer to a side of said tongue from which said webbing is inserted into said webbing receiving hole than the surface of said operating portion.

7. An inflatable seatbelt system according to claim 3, wherein the surface of said gas outlet portion lies closer to a side of said tongue from which said webbing is inserted into said webbing receiving hole than the surface of said operating portion.

* * * * *